Nov. 16, 1943.  C. E. MILLER  2,334,211
GAS GENERATOR
Filed July 11, 1942
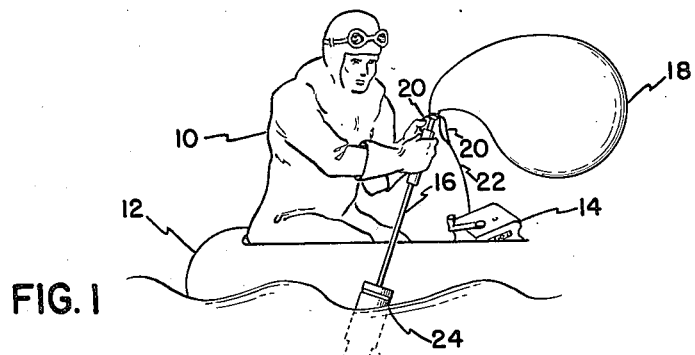
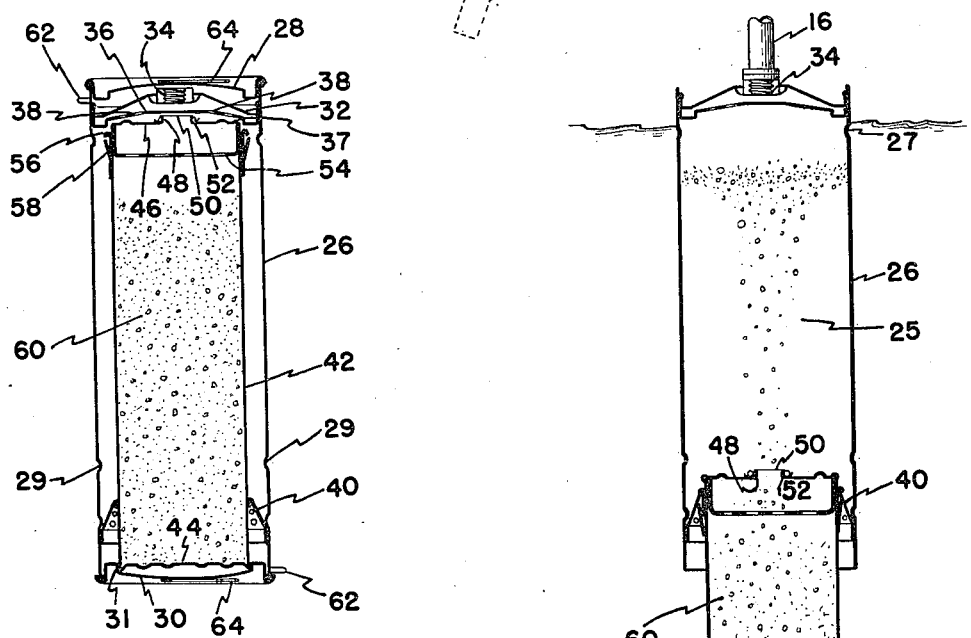
FIG. 1
FIG. 2
FIG. 3
INVENTOR.
CHARLES E. MILLER
BY  H. W. Brelsford
ATTORNEY Patented Nov. 16, 1943

2,334,211

UNITED STATES PATENT OFFICE 2,334,211

GAS GENERATOR

Charles E. Miller, North Hollywood, Calif., assignor, by mesne assignments, to Bendix Aviation, Ltd., North Hollywood, Calif., a corporation of California Application July 11, 1942, Serial No. 450,598

6 Claims. (Cl. 23—282)

This invention relates to gas generators, and more particularly to a portable emergency gas generator having reliable operational characteristics.

Emergency gas generators have a variety of uses, particularly during times of war. For example, a gas generator may be used to inflate signal balloons, or used as a source of illuminating light for means of signals. Gas generators may also be used as a source of welding or heating gas, such as may be needed for field repairs of airplanes and other war equipment. The present invention will be described, however, with reference to a gas generator for inflating a balloon which may be used to carry aloft an antenna for an emergency radio transmitter device. Hydrogen generators are commonly used for this purpose.

Emergency radio transmitters are used extensively on airplanes to enable a pilot to make known his position when he is forced down on land or sea and cannot use an airplane radio. The equipment constituting a part of the emergency transmitter, including the present invention, is often roughly handled. Often it is necessary to drop the equipment from an airplane by means of a very small parachute, which only partially breaks the fall of the equipment to land or sea. The gas generator used, therefore, as well as the other equipment, must be rugged in construction to withstand the impact of landing. In addition, the gas generator must produce a large amount of gas in a very short space of time, calling for maximum output characteristics. Furthermore, for airplane usage the generator should be light in weight, which result is best achieved by using a dry chemical that will react with water which will usually be available in sufficient quantities almost anywhere. It is preferable also that the cost of the generator be as low as is possible with high quality performance.

The present invention satisfies these requirements, and in general comprises a device which retains a dry solid which reacts with water to give off a gas. For example, lithium hydride, calcium hydride, sodium hydride, or similar substances, may be employed in the present invention, to give off hydrogen gas when the substances come in contact with water.

It is therefore an object of the invention to provide a gas generator of rugged construction and optimum operating characteristics.

Another object is to provide a gas generator which is entirely sealed before its operation, so as to exclude moisture and other elements which would cause the chemicals to deteriorate prior to use, thereby reducing its efficiency during the operative period.

It is another object of the invention to provide a gas generator of the type wherein a solid reacts with a liquid, having a construction which will provide for the removal of the residue formed by the reaction, thus maintaining efficient operation throughout the generation period.

It is another object of the invention to provide a gas generator wherein the generated gas passes through a chamber of water for cooling and washing of the gas.

It is another object of the invention to provide a construction such as to permit continual circulation of water within the generator by flushing out the warm, residue-laden water and replacing it with cold fresh water.

Still another object of the invention is to provide a gas generator which may be readily connected to a conduit for operating and for collecting the gas.

In the drawing forming a part of the specification:

Figure 1 is a sketch showing an operator seated on a life raft using the invention to inflate a balloon which may be used to carry aloft an antenna for an emergency radio transmitter;

Figure 2 is an elevation view, in full section, of the invention in its sealed or non-operating condition; and Figure 3 is an elevation view, in full section, of the invention showing it in an operating condition.

Referring to Figure 1, an operator 10 is seated on an inflated life raft 12 which also supports an emergency radio transmitter 14. The operator grasps a tube 16 in his right hand, the upper end of which is connected to a balloon 18. The balloon 18 has two loops 20, one of which is tied to an antenna 22 of the emergency transmitter 14 and the other of which the operator holds in his left hand to prevent the balloon 18 from lifting off of the end of tube 16. Connected to the lower end of tube 16 is a hydrogen generator 24 forming the subject matter of this invention. The operator keeps the generator 24 submerged in water, the water reacting with a solid such as calcium hydride to generate gas, which flows upwardly through tube 16 into balloon 18 inflating the same. The operator 10 continuously moves the generator 24 up and down in the water to flush out the spent water and replace it with fresh, cool water.

Referring to Figure 2, the generator 24 includes an outer cylinder 26 having sealed end plates 28 and 30. These parts may be made of very thin tinned steel, and all joints are sealed by soldering or otherwise to prevent the ingress of air or moisture. When the generator is to be used as an airplane accessory the outer cylinder 26 and end plates 28 and 30 must be designed to withstand the reduced pressure of high altitudes. Connected to the upper part of cylinder 26 is a partition 32 sealed therein, having a threaded opening 34 in the middle to which may be screwed and sealed the holding tube 16 of Figure 1. Just below partition 32 is a baffle plate 36 secured to cylinder 26, and having holes 38 along the sides thereof. Near the bottom of cylinder 26 is secured a frustro-conical baffle 40 having holes therein to permit the passage of water.

Retained within cylinder 26 is an inner cylinder 42 having a bottom plate 44. It will be noted that the bottom of cylinder 42 rests against its shoulders 31 in the end 30 of cylinder 26. Secured to the upper end of cylinder 42 is a closure plate 46 having a flanged hole 48 therein covered by a piece of tissue 50, such as paper, retained in place by the middle ring 52. It will be noted, also, that the upper end of cylinder 42 rests against shoulders 37 formed in baffle 36. Just below closure plate 46 is a screen 54 formed by punching holes in a sheet metal stamping. Secured to the outside of the upper end of cylinder 42 is a catch member 56 and a spring locking member 58. Cylinder 42 is filled with a substance 60 such as calcium hydride, and screen 54 retains the larger particles from contacting tissue 50. Tissue 50, in turn, retains the fine dust particles within container 42.

Protruding from either end of outer cylinder 26 is a tongue 62 of a tear strip to which may be secured a hand key 64 normally secured to the bottom and top 30 and 28, respectively. When it is desired to place the generator 24 in operation, the keys 64 are broken loose from the end plates 30 and 28, placed over tongues 62, and manually twisted until a strip of metal is torn off entirely around outer cylinder 26, permitting the ends 30 and 28 to fall off. This allows inner cylinder 42 to move downwardly with respect to outer cylinder 26 until catch 56 contacts frustro-conical baffle 40 where it is retained in place by spring member 58.

The generator 24 is shown in operation in Figure 3. It will be noted that the tube 16 is screwed in opening 34 and that the inner cylinder 42 has descended downwardly until it rests upon baffle 40. The operator then plunges the entire device manually into water until a suitable water level marker such as annular groove 27 on cylinder 26 is covered with water. Water pressure then forces the air upwardly through tube 16 permitting water to flow through baffle 40 and into the chamber 25 formed by cylinder 26. The water wets tissue 50, which permits a slow leakage of water therethrough until the water passes through screen 54 and contacts the calcium hydride 60. This immediately causes a generation of hydrogen gas which breaks the tissue 50 weakened by water, and the gas forces itself upwardly through the water within chamber 25. This tissue further serves the purpose of controlling the action as well as retaining calcium hydride dust within container 42 which might otherwise be lost prior to operation.

The water in chamber 25 will rise to a level less than the outside water as determined by the pressure sufficient to overcome all back-pressure due the resistance to gas flow offered by baffle 36 and the tube 16 and the resistance of balloon 18. The reaction between the water and the calcium hydride 60 is very violent throwing off the residue, calcium hydroxide, through the screen 54 and the mixture of gas and water prevailing in that region. This residue is then expelled, through opening 48, into the water of chamber 25 where it is picked up by the water, leaving the gas substantially free of solid matter. The violence of the reaction also causes the gas to be generated at a very high temperature, which heats the water in chamber 25 very quickly. If this water were not continually replaced with fresh, cool water it would soon be boiling, permitting water vapor to pass through tube 16 and into balloon 18 where it would condense, weighting down the balloon and hindering its ascent. For this reason, the operator continually moves the entire generator up and down in the water between limit lines 27 and 29 on the outside of container 26. The upward movement allows gas pressure and gravity to expel the water of chamber 25 through baffle 40, taking with it the residue calcium hydroxide. When the entire generator is plunged into the water again, fresh cool water will flow into chamber 25, continuing the cooling operation at maximum efficiency. Heat is also dissipated by conduction through container 26 directly to the surrounding water.

The opening 48 to inner cylinder 42 must be sufficiently large so that enough water is present to create a violent reaction with the calcium hydride. If a small opening were permitted, allowing water to trickle through, the reaction would take place at a very slow rate with no appreciable violence, and the residue calcium hydroxide would soon coat over the calcium hydride, insulating it from water and delaying further generation of gas. For this purpose, by way of example, a hole one inch in diameter has been found very satisfactory for a container three and a half inches in diameter. If the hole is made smaller than this, the reaction will not be violent enough to maintain a self-cleansing action, and a larger hold results in an output too great to be adequately cooled by a chamber in which the container 42 can be telescoped without waste space. The hole 48 regulates the rate of the reaction by limiting the ingress of water, which can enter only when the generation of gas momentarily subsides.

Although this invention has been described with reference to a particular embodiment thereof, it is not limited to this embodiment nor otherwise except by the terms of the following claims.

I claim:

1. A gas generator of the type wherein a liquid reacts with a solid, comprising a container adapted to hold a liquid reactive material therein generating a gas and producing a residue upon such reaction, said container having a hole for the ingress of liquid and the egress of gas, said hole permitting the ingress of sufficient liquid with respect to the material to cause a violence of reaction sufficient to expel with the gas and associated liquid the residue formed by the reaction, and shell means surrounding the top of said container to collect and cool said generated gas, said shell being just slightly larger than the container to accommodate telescoping with the container.

2. A gas generator of the type adapted to be bodily immersed in a liquid and wherein a liquid reacts with a solid to produce a gas, comprising a container having a hole therein and adapted to retain a solid, a screen across the inner opening of said hole, a liquid absorbent tissue covering the outer opening of said hole, said tissue becoming very weak upon absorption of the liquid and an outer enclosure about the upper end of said container, and into which the container may telescope when not in use.

3. A gas generator of the type adapted to be bodily immersed in a liquid, comprising an outer container, an inner smaller container telescoped therein and adapted to retain a substance which reacts with a liquid to form a gas and having a hole therein through which liquid may enter and gas escape, and a removable bottom on said outer container so that the inner container may be projected downwardly from said outer container for operation, the outer container being filled with liquid when immersed therein, which liquid cools the generated gas, the outer container also acting to collect the gas generated in the inner container.

4. A gas generator of the type adapted to be bodily immersed in a liquid, comprising an outer enclosure, an inner container having a hole therein and adapted to be telescoped within the outer enclosure when not in use, and means to limit the extension of the inner container relative to the outer enclosure, said container adapted to retain a substance which reacts with a liquid to form a gas; and said enclosure being adapted to collect gas and cool the gas when the generator is bodily immersed in a liquid.

5. A gas generator of the type adapted to be bodily immersed in a liquid, comprising a container for a gas generating solid which container is closed except for a hole in the top thereof through which liquid may enter and gas escape, an enclosure about the upper end of said container and into which the container may telescope when not in use and having a gas outlet, said enclosure acting to collect gas from the container and to cool the gas while filled with a liquid during immersion, the size of said container hole regulating the violence of the gas generating action between solid and liquid.

6. A gas generator for the inflation of balloons or the like and adapetd to be manually immersed in water for operation comprising, an outer enclosure, an inner container having a hole therein and adapted to retain a water reactive substance for producing gas, said container being adapted to telescope within said enclosure when not in use, and an elongated hollow handle connected to said enclosure so that the generator may be conveniently grasped for immersion and so that the generated gas may be conducted to the gas consuming object.

CHARLES E. MILLER.